United States Patent

Park

Patent Number: 5,221,992
Date of Patent: Jun. 22, 1993

[54] DOOR VIEWER INCLUDING INNER TUBE ENCASING OBJECT LENSES AND OCULAR LENS AND INCLUDING A RUBBERIZED FLEXIBLE HOOD

[76] Inventor: Ki K. Park, 61-15 Doon Chon 2 Dong, Kang Dong Ku, Seoul, Rep. of Korea

[21] Appl. No.: 829,432

[22] Filed: Feb. 3, 1992

[30] Foreign Application Priority Data

Feb. 20, 1991 [KR] Rep. of Korea .................. 112646[U]

[51] Int. Cl.⁵ .................. G02B 7/02; G02B 23/14; G02B 25/04; G02B 23/16
[52] U.S. Cl. .................. 359/504; 359/744; 359/894; 359/600
[58] Field of Search .................. 359/504, 744, 894, 600, 359/611, 612

[56] References Cited

U.S. PATENT DOCUMENTS

| | | | |
|---|---|---|---|
| 2,229,594 | 1/1941 | Seiler | 359/894 |
| 4,116,529 | 9/1978 | Yamaguchi | 359/894 |
| 4,730,911 | 3/1988 | Wood et al. | 359/894 |

FOREIGN PATENT DOCUMENTS 682280 12/1952 United Kingdom ................ 359/504

*Primary Examiner*—Jon W. Henry

[57] ABSTRACT

A doorscope comprising an inner tube which encases two sets of lenses, the one set being the object lens set, encased in the outer, or external portion of the doorscope, and composed of two opposed and adjacent concave lenses, and the other lens being an ocular lens of a convex design, and encased in the internal portion of the inner tube. An outer tube is screwed onto the inner tube, and, having a retaining flange on its outer end, holds the doorscope firmly against the outer surface of the door. An adjusting tube, having an enlarged diameter, milled surface area, is screwed onto the inner, or interior end of the inner tube, and is tightened against the inner surface of the door, using the milled gripping surface, thereby requiring no tools To prevent danger to the viewer when placing their eye against the doorscope, a rubberized hood is affixed onto the inwardly protruding end of the adjusting tube, thereby allowing the viewer to place their eye against the doorscope without danger to the eye.

1 Claim, 1 Drawing Sheet

DOOR VIEWER INCLUDING INNER TUBE ENCASING OBJECT LENSES AND OCULAR LENS AND INCLUDING A RUBBERIZED FLEXIBLE HOOD

BACKGROUND OF THE INVENTION

This invention relates to an apparatus and method of providing means for viewing the exterior area of a door, or other structure, from the inside area, said area being protected by the door, or other structure. This invention relates more specifically to providing this viewing with sufficient lighting, said lighting providing a more clear, and brighter image to the viewer. This invention also relates to a doorscope apparatus which can be installed through a hole in the door, or other structure, without the need for any tools, or other hardware. This invention also relates to a doorscope apparatus which provides means for protection of the eyes of the viewer during viewing. It has been customary to design these doorscopes using an inner tube structure, said inner structure having external threads, and being affixed with two concave object lenses in the front, or outer end of said tube, and a convex ocular lens in the rear, or inner end of said inner tube. These two lens systems being fitted within the inner diameter of said inner tube, and affixed therein. Two outer tubes, one affixed within the outer portion of a door, or other structure, and one affixed within the inner portion of the door or other structure, and both outer tubes being provided with mating internal threads with the external threads of the inner tube, are screwed onto said inner tube, using a set of appropriate tools, and normally utilizing provided grooves formed on the circumference of the two outer tubes.

In other cases, more elaborate tools are required for affixing the doorscope into the hole in the door, or other structure. Also, the viewing end of the doorscope is usually flush with the inside of the door, or other structure, or, projects inward from the inner surface of the door a short distance, requiring the viewer to place their eye onto the viewing surface, thereby subjecting the eye to the sharp affixing grooves in the outer tube, thereby creating a safety hazard to the viewer.

These types of doorscopes present a very inconvenient and dangerous environment to the viewer.

A typical doorscope of this type is described in FIG. 1, where two object concave lenses 1, and 1' are affixed into an inner tube 2, at the outer, exterior end of said inner tube, and an ocular, convex lens 3 being affixed into the inner, internal end of said inner tube 2, and both sets of lenses, 1, 1'', and 3, being held in place by a retaining tube 5, and said inner tube 2 being inserted into a hole in a door, or other structure 7, said inner tube 2 being equipped with external threads 6, and said interna threads 6 being screwed into an outer tube 4, and tightened against said door by means of a screw slot 9.

Both inner tube 6, and outer tube 4 having a flange 8 affixed onto their outer ends, said flange providing means for tightening said inner tube 2, and said outer tube 4 in place in said hole in the door 7.

SUMMARY OF THE INVENTION

Accordingly, it is an object of this invention to provide a new and improved apparatus and method, for more clearly viewing the exterior through a door, or other structure from the inside.

It is another object of this invention to provide this apparatus with a protective eyepiece, to eliminate the danger of damage to the eye of the viewer.

It is another object of this invention to provide this apparatus in a simple design, which can be installed without the aid of tools.

Still another object of this invention is to provide this apparatus with capability to be affixed into doors, or other structures of different thicknesses.

In carrying out this invention in the illustrative embodiment thereof, a hollow tube, formed with external threads, and of a length to protrude through a door, or other structure, is fitted with two sets of lenses, an object lens system, and an ocular lens system. One set of lenses, is a pair of object lenses, comprising two opposed concave lenses of a diameter to fit into, and be affixed to, the outer, or exterior end of said inner tube, and the other lens is a convex, ocular lens of a diameter to fit into, and be affixed to, the inner, viewing end of said inner tube, said ocular lens being the viewing lens of the doorscope. An outer flanged tube, formed with mating external threads to the inner tube, and an inner fanged tub, with mating external threads to the same inner tube, are screwed onto, or otherwise affixed onto the said inner tube containing said two lens systems, the flanges on the said outer tubes providing fixing means onto the door, or other structure, thusly holding the doorscope in place in the said door, and providing means for the viewer to visually scan the exterior of the said door.

A larger diameter milled surface, encircling the inner flanged tube is a gripping surface, and provides the leverage required to tighten the two outer flanged tubes onto the door surfaces, thereby affixing the entire doorscope onto, and through the said door, or other structure, without the aid of any tools A rubberized hood piece is affixed onto the inner flanged tube, providing means for the viewer to contact the doorscope with no danger of damage to the viewers eye.

Conveniently, a viewer can approach the doorscope, affix their eye into the rubberized hood piece, and view the exterior of a door, or other structure from the interior of the door, or other structure.

BRIEF DESCRIPTION OF THE DRAWINGS

This invention, together with other objects, features, aspects, and advantages thereof, will be more clearly understood from the following description, considered in conjunction with the accompanying drawings.

COMPLETE DESCRIPTION OF THE PREFERRED EMBODIMENT

Figure 1:
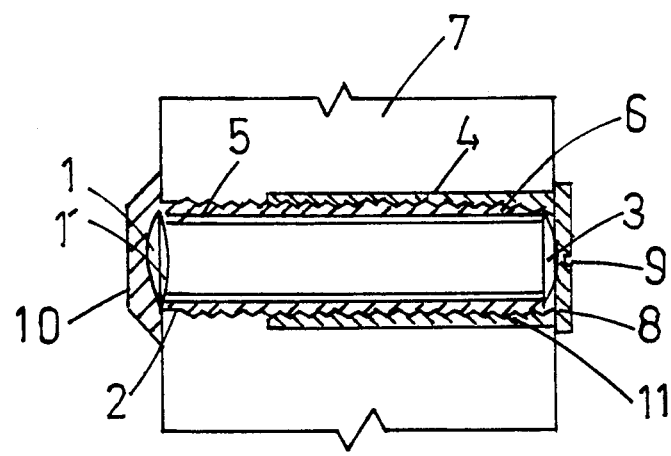
FIG. 1 is a cut-away view of a typical doorscope

Referring to FIG. 1, a typical doorscope having two sets of lenses, an object lens pair referred to by the reference numerals 1, and 1', and an ocular lens 3, are affixed into a hollow tube 5, and said hollow tube 5 being affixed into an inner tube 2, and an outer tube 4, said tube 4 being equipped with external threads 6, and said inner tube 2 being equipped with internal mating threads 11. As can be seen in FIG. 1, said inner tube 2, is fitted with a retaining flange 10, and said outer tube 4 being fitted with a retaining flange 8. Now in operation, the inner tube 2 is inserted into a hole in a door 7, the outer tube 4 is inserted into the said hole in said door 7, and screwed onto said inner tube 2, using a screw driver, or other tool, said tool being inserted into screw slot 9, and tightened until said doorscope is firmly affixed into said door 7, thusly describing a very dangerous and inconvenient typical doorscope.

Figure 2:
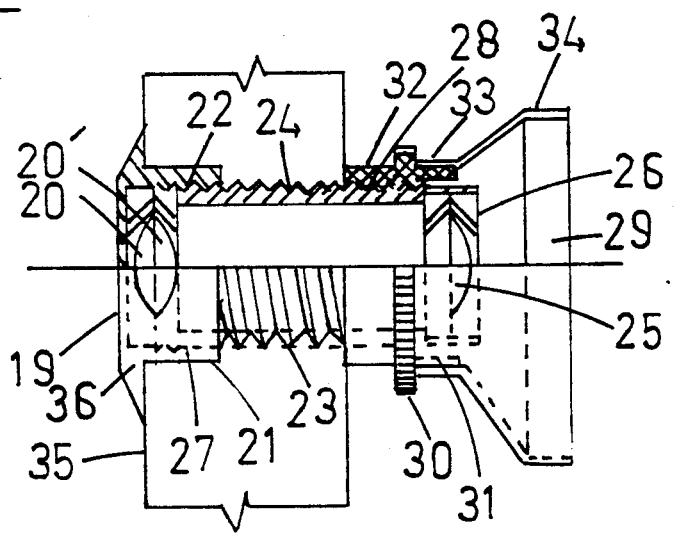
FIG. 2 is a partial cut-away view of the invention, showing the placement of the lenses, and the rubberized viewing hood

Referring now to FIG. 2, we see a doorscope of this invention, generally referred to as the numeral 19 comprising two sets of lenses, 20, 20' and 25, encased in an inner tube 23. The two lenses 20, and 20' are opposing concave lenses, and are encased in the frontal portion of the inner tube 23, a distance from the frontal opening of said inner tube 23. The lens 25 is a convex lens, encased in the rearward portion of said inner tube 23, by a retaining ring 26, a distance from the rearward end of said inner tube 23.

Affixed onto the frontal end of said inner tube 23 is an outer tube 21, and said outer tube 21 having a locating flange 36, said locating flange 36 to hold said inner tube 23 in a preplanned location in a door 35. The inner tube 23 having external threads 24, and said outer flange 36 having mating internal threads 22, thereby holding said inner tube 23, and said object lenses 20, and 20' in place, in said door 35.

Now, and still referring to FIG. 2, an adjusting tube 32, having mating internal threads 28 to the internal threads 22, and a larger diameter grip surface 30, is screwed onto said inner tube 23, and tightened against the inner surface of said door 35, without the need for any tools, thereby providing means for the user of the doorscope 19 to view the area external to the door 35.

Still referring to FIG. 2, a rubberized hood 34 is affixed to the rearward, protruding section 33 of the adjusting tube 32, said rubberized hood 34 providing means for the viewer to place their eye against said rubberized hood 34 without danger to the eye of the viewer.

Figure 3:
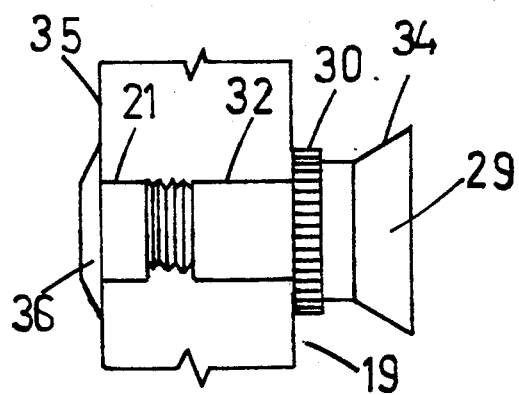
FIG. 3 is a plan view of the invention, mounted into a door.

Referring now to FIG. 3 the assembled doorscope 19 is shown affixed into and through said door 35, and tightened against said door interior by said grip surface 30, and held in place in said door 35 by said grip surface 30, and said flange 36, making provision for an oversized hole in said door 35, and the rubberized hood 34 thusly providing a safe viewing area 29 to the user of said doorscope 19.

Accordingly, a very unique, attractive, convenient method and apparatus are provided for viewing the exterior of a door, or other structure, from the interior of a room, or other area. Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements

What is claimed is:

1. A doorscope, comprising:
   an inner tube, said inner tube having external threads, and said inner tube encasing two sets of lenses, one said set of lenses being two adjacent and opposed object lenses of a concave contour, encased in the outer, or external end of said inner tube, and one said set of lenses being a convex ocular lens encased in the inward end of said inner tube,
   an outer tube, said outer tube having mating internal threads, and said outer tube having a retaining flange formed on its outer end portion, and having means to be screwed onto the outer end of said inner tube, thereby retaining said inner tube in a door, or other structure,
   an adjusting tube having mating internal threads to said external threads of said inner tube, and said adjusting tube having an enlarged gripping surface, said gripping surface being milled to increase the gripping capability, and said adjusting tube having a flange formed- onto its inward end, said flange providing means for tightening said doorscope onto the inner surface of a door, or other structure, when said adjusting tube is screwed onto said inner tube, without aid of tools,
   a rubberized, flexible hood being affixed onto the outer protruding diameter of said adjusting tube, thereby providing means for a viewer to place their eye close to said adjusting hood without danger of damage to said eye.

* * * * *